(12) United States Patent
Stoakley et al.

(10) Patent No.: US 6,756,999 B2
(45) Date of Patent: Jun. 29, 2004

(54) METHOD AND SYSTEM FOR CLUSTERING AND GROUPING TASKBAR BUTTONS

(75) Inventors: Richard W. Stoakley, Seattle, WA (US); James B. Kurtz, Bellevue, WA (US); James F. Springfield, Woodinville, WA (US); Todd J. Green, Seattle, WA (US); Suzan M. Andrew, Seattle, WA (US); Justin Mann, Lake Forest, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 09/799,750

(22) Filed: Mar. 6, 2001

(65) Prior Publication Data

US 2001/0035882 A1 Nov. 1, 2001

Related U.S. Application Data (60) Provisional application No. 60/195,611, filed on Apr. 6, 2000.

(51) Int. Cl.$^7$ ................................................ G09G 5/00
(52) U.S. Cl. ...................... 345/779; 345/810; 345/811; 345/840; 345/841; 345/837; 345/764; 345/765
(58) Field of Search ................................. 345/779, 811, 345/810, 840, 841, 837, 764, 765

(56) References Cited

U.S. PATENT DOCUMENTS 5,317,728 A * 5/1994 Tevis et al. ................. 707/204
5,920,316 A * 7/1999 Oran et al. .................. 345/779
6,489,975 B1 * 12/2002 Patil et al. ................... 345/781
6,613,100 B2 * 9/2003 Miller ......................... 715/526

OTHER PUBLICATIONS

Rahn, Torsten. Dec. 2, 1999, Geocrawler.com : "Thread: MDI/SDI—THE Solution !!! (\Feature–request for the taskbar/kasbar)".*

Microsoft(R) Windows. 1981–1998, Microsoft Corp. Windows NT Version 4.0.*

ISM Technical Disclosure Bulletin, Issue No. 426, p. 1371. Oct. 1, 1999, UK. "2–Dimensional Taskbar".*

* cited by examiner

Primary Examiner—John Cabeca
Assistant Examiner—Sara M. Hanne
(74) Attorney, Agent, or Firm—Shook, Hardy & Bacon, L.L.P.

(57) ABSTRACT

A method and system are provided for organizing, displaying, and accessing representations of one or more running tasks on a graphical user interface in a computer system. The system organizes like application files and clusters the corresponding taskbar buttons and, upon reaching a threshold limit, creates and displays a group button that contains the like application files and removes the like taskbar buttons from the taskbar. Further, upon reaching a second threshold limit, the system ungroups the application taskbar buttons, displays them on the taskbar and removes the group button from the taskbar.

30 Claims, 5 Drawing Sheets

METHOD AND SYSTEM FOR CLUSTERING AND GROUPING TASKBAR BUTTONS

CROSS-REFERENCE TO RELATED APPLICATIONS

This application claims the benefit of U.S. provisional application Serial No. 60/195,611, filed Apr. 6, 2000.

TECHNICAL FIELD

The present invention relates generally to computer software and, more particularly, to a method and system for organizing, displaying, and accessing running applications and files in a computer system.

BACKGROUND OF THE INVENTION

Computer operating systems commonly use taskbars as a tool to access computer applications and their associated files in a computer system. Taskbar buttons are typically a user interface representation of running tasks and provide a simple access method for users to get to these running tasks. Typically, as applications and application files are opened, corresponding buttons appear on the taskbar. These buttons traditionally provide a link to the application file so that when the button is selected by a user, the application file appears on the screen. Thus, users can browse the taskbar to see the appropriate file they wish to view and select the appropriate button on the taskbar in order to view that file.

Taskbar buttons are created as application files are opened by a user within a computer's operating system. Taskbar buttons traditionally display an icon and text within the button that corresponds to the name of a running application or application file. As more application files are opened, the number of taskbar buttons increase along the taskbar. Consequently, the size of the taskbar button decreases to the point where the text on the taskbar is no longer meaningful.

In the "WINDOWS" operating system, as a user opens application files, corresponding taskbar buttons appear on the taskbar. As more application files are opened, the buttons decrease in size to allow them to fit within the taskbar given the current screen resolution. The taskbar may reside horizontally at the top or bottom of the display or vertically along the sides of the display. As new application files are opened and corresponding buttons are added to the taskbar, they are added to the right-most or bottom-most portion to the taskbar.

As mentioned earlier, when multiple taskbar buttons are created along the taskbar, especially in a horizontal position, it becomes difficult to read the text within the taskbar buttons. To determine the contents of a button, a user may place a selection tool over each of the buttons. When the selection tool is over the button, an expanded text message appears that allows the user to ascertain the identity of the file. Additionally, the user may use the button icon as a visual queue to the contents of the window represented by the button. This becomes ineffectual when there are multiple windows represented by the same icon. Thus, switching between running tasks when numerous application files are opened becomes burdened by the necessity of hovering over buttons and waiting for the text message to appear.

Alternatively, a user may not use the taskbar at all to determine what file to view because the size of the taskbar buttons limit the user's ability to quickly determine which button applies to certain file. For example, if a user has multiple word processing documents opened in a word processing application program, the user may utilize the word processing application to search for the document of choice. Such a process eliminates the short-cut procedure provided by utilizing the taskbar. As a result, the user performs additional steps to find a document. This process is slow and requires numerous repetitive user operations. Additionally, this process bypasses the primary function of the taskbar, namely, to provide a simple method to access running application files.

Accordingly, there exists a need to better organize the taskbar when it becomes crowded. Moreover, there is a need for such a method and system to create a more efficient and faster user interface representation of running tasks.

SUMMARY OF THE INVENTION

Generally described, a method in a computer system for organizing and displaying taskbar buttons associated with corresponding applications on a display having a taskbar is provided. In accordance with the method, the application file associated with a taskbar button is identified and taskbar buttons having like application files are placed together on the taskbar to form a cluster. Further, the method of the present invention monitors the space available for each taskbar button on the taskbar and compares the monitored space available against a first predetermined threshold value. If the space available is less than the first predetermined threshold, the like application taskbar buttons are grouped together. Additionally, the method compares the monitored space available value against a second predetermined threshold value and ungroups the like application files if the space available is more than the second predetermined threshold.

In another aspect of the present invention, a method of providing and selecting clustered and grouped taskbar buttons in a computer system having a graphical user interface is provided. The graphic user interface further includes a display and a user interface selection device. According to the method of the present invention, the system retrieves multiple application program files having corresponding taskbar application buttons and displays the taskbar application buttons on the taskbar. Like application taskbar application buttons are clustered together and upon meeting a predetermined size limit, the system retrieves a group application button. The group application button is displayed and each of the like taskbar application buttons are removed from the taskbar. Upon meeting an ungroup threshold size, each of the like application buttons on the taskbar is displayed and the group application button is removed from the taskbar.

In a further aspect of the present invention, a computer-readable medium having data stored in a button data structure is provided. The button data structure includes a first data field containing data representing a button application handle to communicate with an application file. The structure further includes a second data field containing data representing a button application name corresponding to the application file. Additionally, the button structure contains a third data field containing data representing a button status to indicate when the application file was last accessed. The data structure also includes a fourth data field containing data representing a button state to determine if the button is visible or hidden.

In yet another aspect of the present invention, a computer-readable medium having data stored in a cluster data structure is provided. The cluster data structure includes two or more data fields containing data representing like application button data structures with each of the like application button data structures having a button state to determine if the button is visible or hidden. Further, the cluster structure includes a group data field containing data representing a group button data structure. The group button data structure also has a button state to determine if the button is visible or hidden. Additionally, the cluster structure includes a state data field containing data representing a cluster state to determine if the cluster structure is normal or grouped.

A method and system are provided for organizing and displaying taskbar buttons in a graphical user interface. The system organizes like application files and clusters the corresponding taskbar buttons and, upon reaching a threshold limit, creates and displays a group button that contains the like application files and removes the like taskbar buttons from the taskbar. Further, upon reaching a second threshold limit, the system ungroups the application taskbar buttons, displays them on the taskbar and removes the group button from the taskbar.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
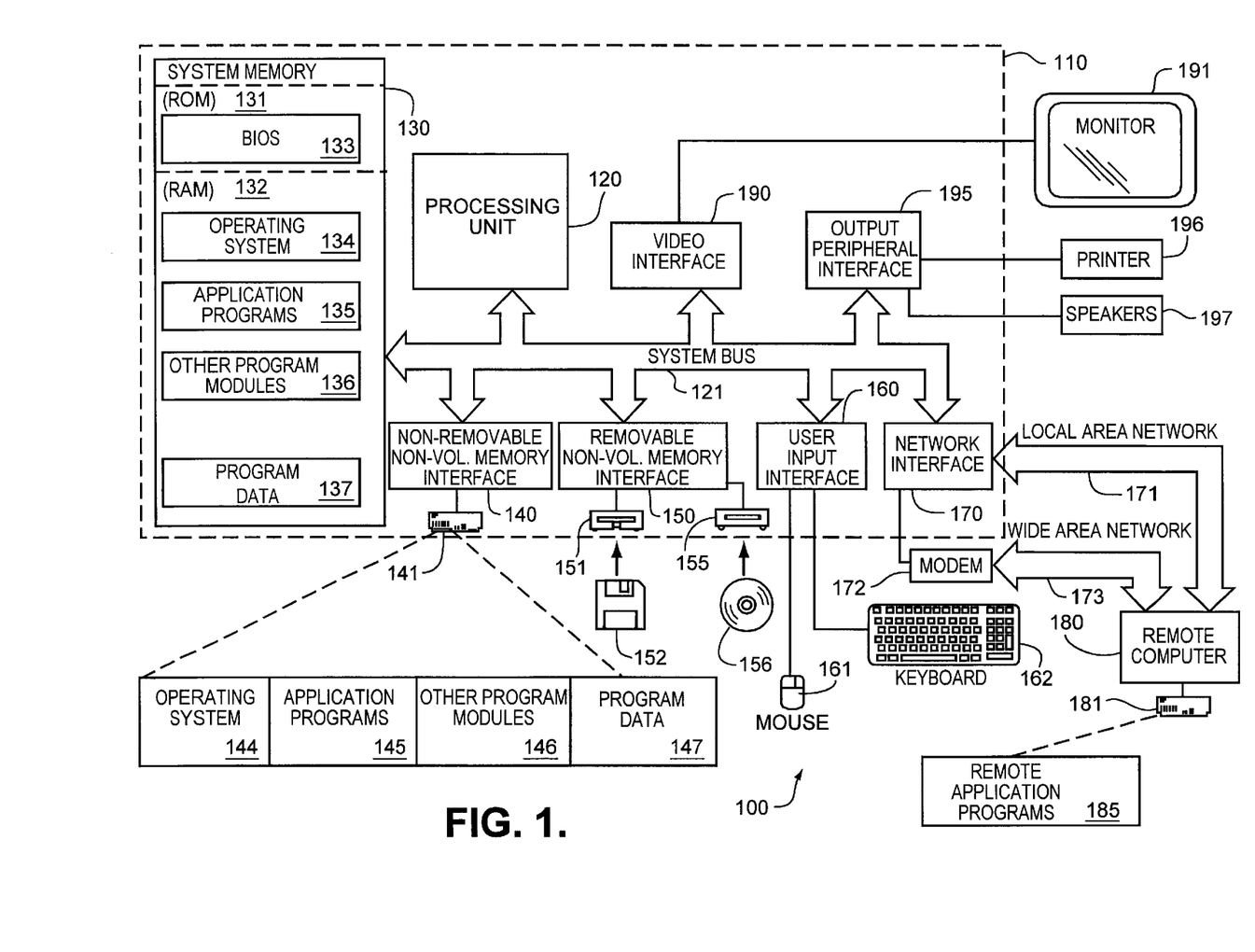
FIG. 1 is a block diagram of a computing system environment suitable for use in implementing the present invention.

The present invention provides a method and system for creating a more efficient user interface representation of running tasks. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The method and system of the present invention allow the user to quickly examine the taskbar to view running application files and efficiently move between and select each running application. Although the method and system are described as being implemented in a "WINDOWS" operating system by "MICROSOFT", one skilled in the art would recognize that the method and system can be in any system supporting a graphical user interface that displays a representation of more than one running task.

Figure 2:
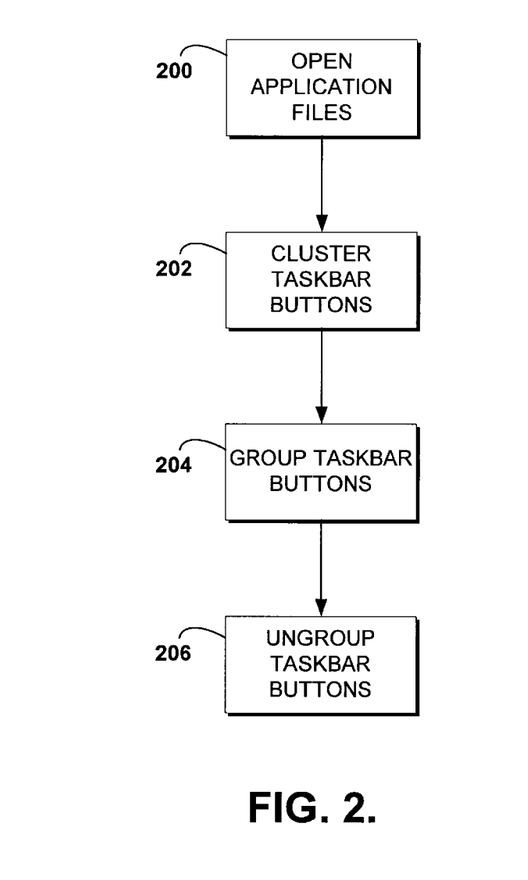
FIG. 2 is a flow diagram illustrating a preferred method for clustering and grouping taskbar buttons.
Figure 6:
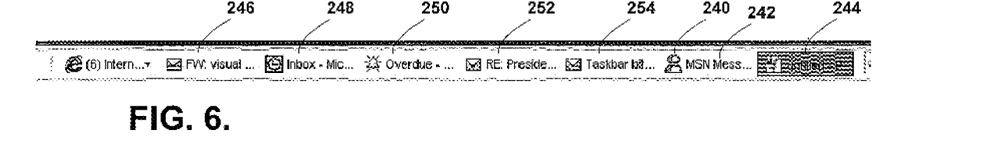
FIG. 6 is a view of a taskbar of the present invention illustrating the clustering of individual application taskbar buttons.

As best seen in FIG. 2, the present invention involves a method for clustering and grouping taskbar buttons. At step 200, a user opens one or more application files. The application files may be word processing documents, database documents, email documents, or any other type of file or application that may be run on a computer. Each application file has an associated taskbar button and as application files are opened, corresponding buttons appear on the taskbar. The taskbar is typically located along the bottom of a computer display but may be moved by the user to any edge of the display. FIG. 6 illustrates a view of a taskbar on a display produced in the "WINDOWS" operating system. As shown in FIG. 6, a taskbar button has an icon 240 associated with a particular application and a title 242 that corresponds to the title bar of the application file. As more application files are opened, the number of corresponding taskbar buttons increase. Returning to FIG. 2, the newly created taskbar buttons are clustered by like application at step 202. For example, all open processes utilizing a specific web browser are like application files and are clustered together. In this application, "clustering" means placing like application files together on the taskbar. A preferred methodology for clustering the taskbar buttons will be described in greater detail below.

As more taskbar buttons are created, the size of the buttons decrease due to the limited available space, until a threshold size is reached. Once this threshold is reached, the system groups the taskbar buttons into a group button at step 204. In this application, "grouping" is defined as replacing individual like application buttons with a group button on the taskbar. A preferred grouping methodology will be discussed in greater detail below.

As the user closes application files running on the computer, the number of buttons on the taskbar is reduced and their size is increased. When the size of the taskbar buttons reaches an ungrouping threshold limit, the individual taskbar buttons within the group button will be ungrouped at step 206 resulting in the individual taskbar buttons again being displayed on the screen.

Figure 3:
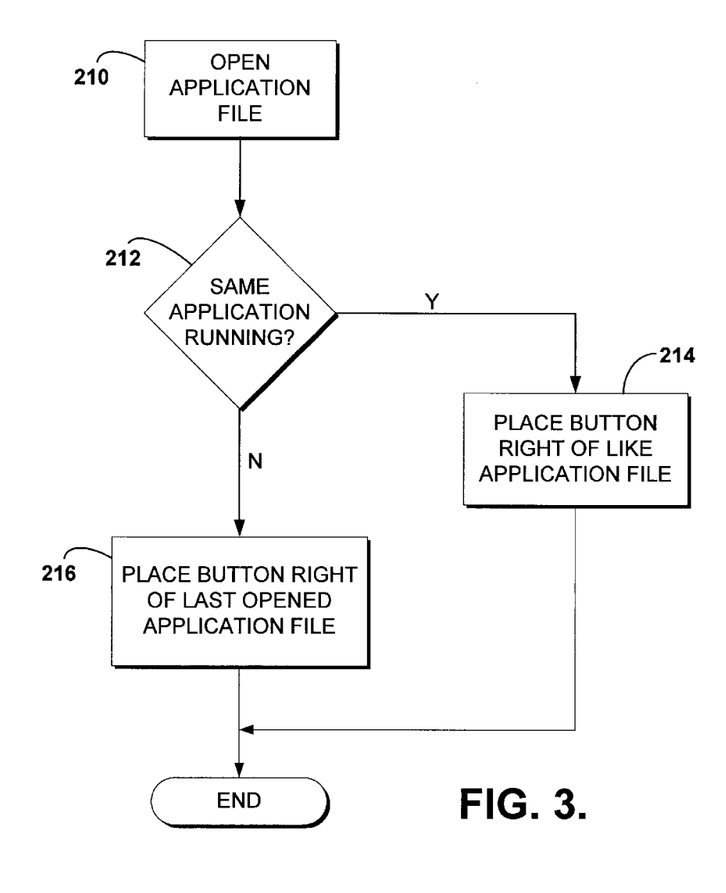
FIG. 3 is a flow diagram illustrating a preferred method for clustering taskbar buttons.

As stated above, the present invention involves clustering taskbar buttons of like applications. FIG. 3 is a flow diagram illustrating a clustering methodology involved in step 202 of the present invention. At step 210, an application file is opened by the user. As described earlier, as an application file is opened, a corresponding taskbar button is displayed on the taskbar. The system then determines if there is a like application running on the system at step 212. If there is an existing button open on the taskbar corresponding to the same application as the newly opened file, the system places the new button next to, and to the right of, the existing button at step 214. If there is not a like application file opened, the system places the button to the right of the last opened application file at step 216. This process is repeated as application files are opened on the computer system.

For example, as illustrated in FIG. 6, the most recently opened application Paint is represented by taskbar button 244. Because this is the first instance of an open Paint application, the system will place the corresponding taskbar button at the right-most position on the taskbar according to step 216 in FIG. 3. In FIG. 6, there are five taskbar buttons 246, 248, 250, 252, and 254 that are clustered together. While some of the buttons 246,248,250,252, and 254 have different icons, each is a "MICROSOFT" "OUTLOOK" application file. If the file corresponding to button 254, labeled "Taskbar bit . . . " is the most recently opened file, the "Taskbar bit . . . " button is placed to the right of button 252 labeled "RE: Preside . . . " according to step 214 in FIG. 3. In other words, the "Taskbar bit . . . " button in FIG. 6 is placed to the immediate right of the right-most taskbar button running the same application. This placement is an example of clustering like application taskbar buttons.

Figure 4:
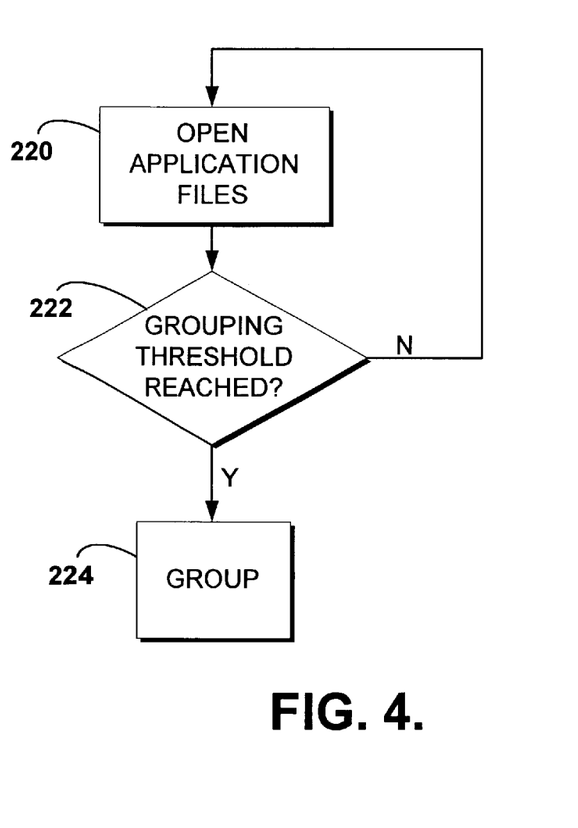
FIG. 4 is a flow diagram illustrating a preferred method for grouping taskbar buttons.

As stated above, the present invention also involves grouping taskbar buttons. FIG. 4 is a flow diagram illustrating a grouping methodology for the present invention. At step 220, multiple application files are opened by the user. As the application files are opened, the system clusters the taskbar buttons corresponding to the application files as described above. At step 222, the system determines if a grouping threshold has been reached. The grouping threshold, broadly defined, is a predetermined value representing the minimum amount of space available for a taskbar button on the taskbar. The predetermined value is preferably a value that allows the taskbar button to display enough information to allow the computer user to identify the file. In a preferred embodiment, the grouping threshold is defined as the width in pixels of the taskbar application icon plus three characters of text plus button margins as prescribed by the operating system. If a grouping threshold is met, application files are then grouped into one group button at step 224. If the grouping threshold has not been met, the system takes no action, but continues to monitor for a grouping threshold.

Those skilled in the art will appreciate that the group threshold limit may be altered to any desired size to facilitate the desired results of the present invention. Grouping of individual application files will occur when there are two or more like application files open in the application and the application is not yet grouped. In one embodiment, if there are several sets of ungrouped application buttons on the taskbar, the system will group the buttons associated with the application used longest ago. In another embodiment, if several sets of ungrouped buttons appear on the taskbar, the system will group the largest set of ungrouped buttons. In still another embodiment, the system will group a set of ungrouped buttons when the number of ungrouped buttons equals or exceeds a predetermined or selected fixed number of open application files.

Figure 7:
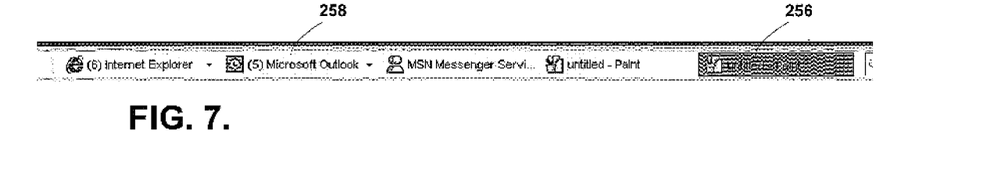
FIG. 7 is a view of a taskbar of the present invention illustrating the grouping of individual application buttons on the taskbar.

FIG. 7 is a view of the taskbar illustrating the grouping of individual application buttons on the taskbar. The taskbar of FIG. 7 represents an environment identical to that of FIG. 6, except that a new untitled Paint file has been opened and a corresponding taskbar button 256 has been placed at the right-most position on the taskbar. Upon the opening of this paint file, the group threshold level is met. In other words, the space available for each taskbar button is below the preset limit. Therefore, according to step 224 in FIG. 4, the system determines the proper application cluster to group. Because the "OUTLOOK" cluster was used longest ago, the system groups the five individual "OUTLOOK" taskbar buttons 246, 248, 250, 252, 254, and 256 in FIG. 6 into one group button 258 in FIG. 7.

The group button 258 created by the grouping methodology represents an entire group of individual application files as illustrated in FIG. 7. Text on the group button is the application friendly name. In the case of group button 258, the text is "'MICROSOFT' 'OUTLOOK'". The icon used for the group button is the same icon used by the application executable file. Immediately to the right of the icon is a number in parentheses. This number represents the number of individual application files associated with the group button.

Figure 8:
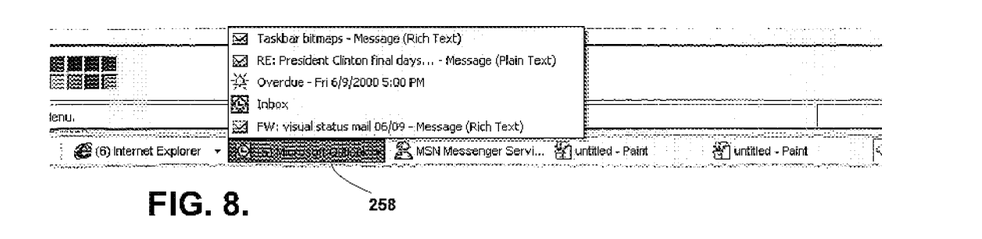
FIG. 8 is a view of the taskbar illustrating the menu feature of a group button on the taskbar.

As illustrated in FIG. 8, group buttons function as menu items. The menu items are the individual files opened in that particular application. To access a particular group menu, the user selects the group button resulting in a display of the menu containing the individual application file names. Text used to identify each of the files is the same text that is available on the title bar of that particular application's window. This typically consists of the icon followed by a string of text. Note that the text string gives more complete information compared to the taskbar button because more space is available.

Figure 5:
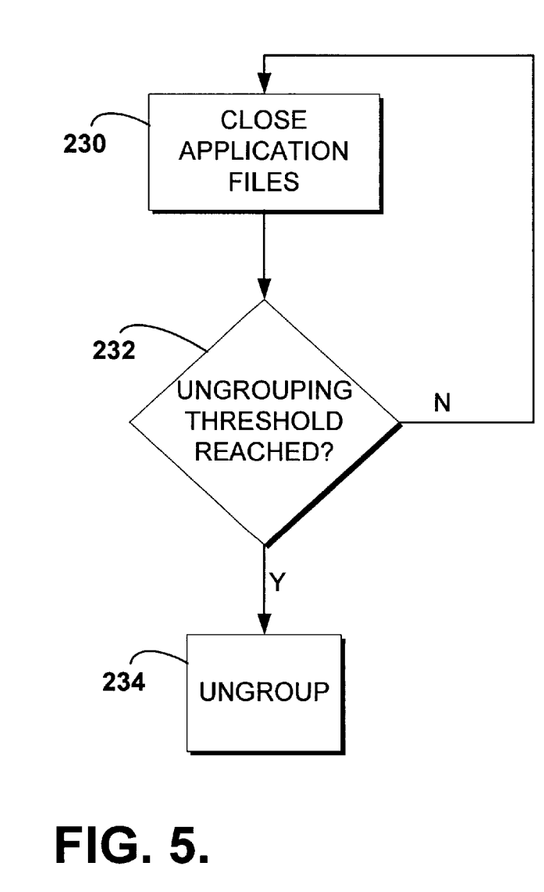
FIG. 5 is a flow diagram illustrating a preferred method for ungrouping taskbar buttons.

As application files are closed, taskbar buttons are ungrouped. FIG. 5 is a flow diagram illustrating the ungrouping methodology of the present invention. As application files are closed in the system, at step 230, the system determines if an ungrouping threshold has been met at step 232. The ungrouping threshold is designed to allow ungrouping of the individual application files when the grouping threshold plus some additional margin is achieved. In a preferred embodiment, for a given horizontal taskbar width, a maximum number of buttons can appear on the taskbar before the buttons cross the grouping threshold width mentioned above. At the given horizontal taskbar width, ungrouping will occur when there are some number fewer buttons on the taskbar than the maximum number that exist prior to the grouping threshold width being met. In a preferred embodiment, two button widths are used as the margin of additional button widths. If the ungrouping threshold has been met, the group button is removed and the individual application task bar buttons are then displayed at step 234. For example, ungrouping of the "MICROSOFT" "OUTLOOK" files is illustrated by moving from FIG. 7 to FIG. 6. Ungrouping will occur when the ungrouped buttons have a width greater than the grouping threshold width. If the ungrouping threshold has not been reached, the system takes no further action, but continues to monitor for the ungrouping threshold as application files are closed.

As with the grouping methodology, the system may use one of several methods for determining the first group button to ungroup. In one embodiment, applications that are used most recently are the first group buttons to be ungrouped. In another embodiment, applications with the least number of open items are ungrouped first. In still another embodiment, when the number of open individual application items within the group falls below a fixed number, the system ungroups the group button. In each case, an application may only ungroup if the taskbar is able to accommodate all the buttons with the resulting taskbar button widths greater than the group threshold size defined above.

Figure 9:
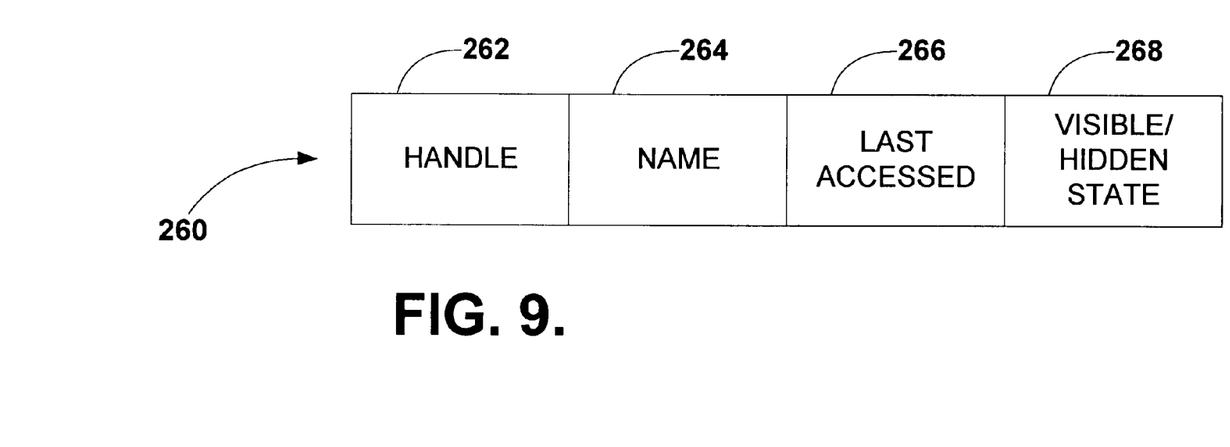
FIG. 9 is a block diagram of a taskbar button data structure of the present invention.
Figure 10:
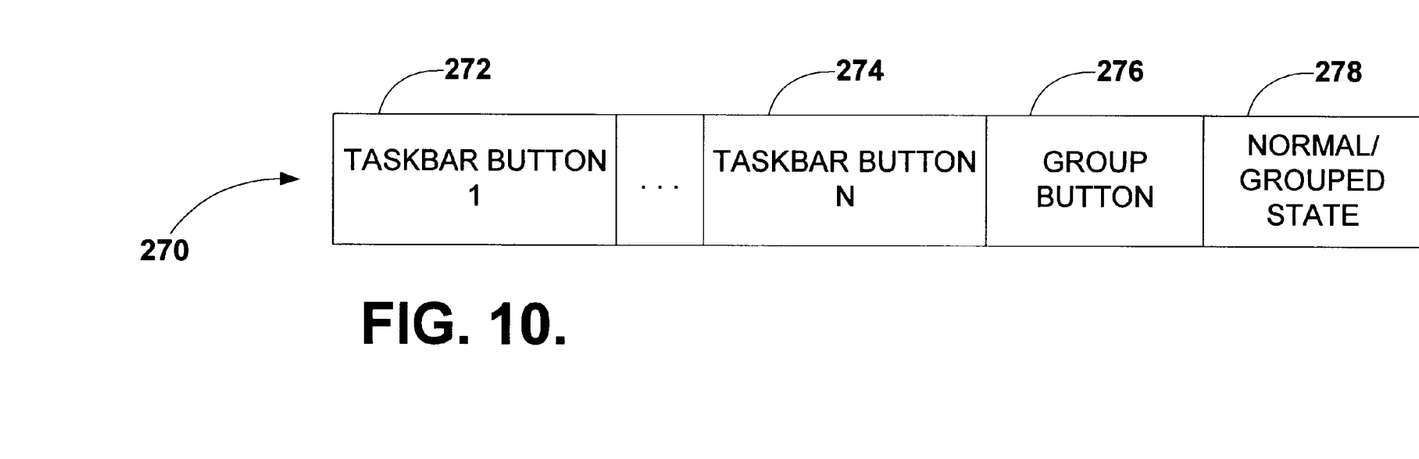
FIG. 10 is a block diagram of a cluster data structure of the present invention.

Turning to FIG. 9, a block diagram illustrating a taskbar button structure 260 is shown. Structure 260 contains an application handle 262 that provides the ability for the taskbar button to communicate with the application file and also an executable application name 264 corresponding to that file. The data structure 260 also includes a last accessed field 266 to indicate when the application file was last accessed by the user. Additionally, structure 260 includes a state field 268 to indicate if the button is visible or hidden. Like individual button structures 260 are stored and sorted into a cluster data structure 270 as illustrated in FIG 10. The cluster structure 270 includes two or more like individual taskbar button structures 272 and 274 (also 260 in FIG. 9) having identical executable application names and a group button 276 that is created to represent the entire cluster. The group button 276 has the same structure as button structure 260 and includes a handle field 262, a name field 264, a last accessed field 266 and a state field 268. Each cluster data structure has a state 278 that is either normal or grouped. As mentioned above, each button structure 260 has a state field 268 (FIG. 9) that is either visible or hidden. When a cluster is in its normal state, all its individual application buttons are visible except for the group button, which is hidden. When a cluster is in its group state, all its individual buttons are hidden except for the group button which is visible.

The present invention provides users a meaningful method and system to view and access multiple running tasks by utilizing a taskbar. The system organizes like application files together into clusters as illustrated in FIG. 6. Then, upon reaching a threshold limit, the system creates and displays a group button that contains the individual application files as illustrated in FIG. 7.

Alternative embodiments of the present invention will become apparent to those skilled in the art to which it pertains upon review of the specification, including the drawing figures. The various computer systems and components shown in FIGS. 1–10 and described in the specification are merely exemplary of those suitable for use in connection with the present invention. Accordingly, the scope of the present invention is defined by the appended claims rather than the foregoing description.

We claim:

1. A method in a computer system for organizing and displaying taskbar buttons associated with corresponding applications on a display having a taskbar, comprising:

receiving a command to create a taskbar button for an application file;

identifying an application associated with the application file;

identifying any existing taskbar button representing a file created from the identified application; and automatically creating the new taskbar button and placing it adjacent to the identified existing taskbar button created from the identified application, such that task bar buttons for like application files are displayed adjacent one another on the taskbar to form a cluster.

2. The method as recited in claim 1 further comprising:

monitoring the space available for each taskbar button on the taskbar;

comparing the monitored space available value against a first predetermined threshold value; and grouping, if the space is less than the first predetermined threshold.

3. The method as recited in claim 2 further comprising:

comparing the monitored space available value against a second predetermined threshold value; and ungrouping, if the space is more than the second predetermined threshold.

4. The method as recited in claim 3, wherein the first predetermined threshold value and the second predetermined threshold value are different.

5. The method as recited in claim 3 further comprising:

monitoring for the application last used longest ago; and grouping according to the application last used longest ago.

6. The method as recited in claim 3 further comprising:

when two or more groups are formed, monitoring for the application last used; and ungrouping according to the last application used.

7. The method as recited in claim 3 further comprising:

monitoring for a fixed number of application files used; and grouping when equal to or greater than the fixed number of application files used.

8. The method as recited in claim 3 further comprising:

when two or more groups are formed, monitoring for a fixed number of application files used; and ungrouping when less than the fixed number of application files used.

9. A method in a computer system for organizing and displaying taskbar buttons associated with corresponding applications on a display having a taskbar, comprising:

identifying the application file associated with a taskbar button;

automatically placing all taskbar buttons having like application files together on the taskbar to form a cluster;

comparing the monitored space available value against a second predetermined threshold value;

ungrouping, if the space is more than the second predetermined threshold;

monitoring for the largest number of application files used; and grouping according to the largest number of application files used.

10. A method in a computer system for organizing and displaying taskbar buttons associated with corresponding applications on a display having a taskbar, comprising:
- identifying the application file associated with a taskbar button;
- automatically placing all taskbar buttons having like application files together on the taskbar to form a cluster;
- comparing the monitored space available value against a second predetermined threshold value:
- ungrouping, if the space is more than the second predetermined threshold;
- when two or more groups are formed, monitoring for the least number of application files used; and
- ungrouping according to the least number of application files used.

11. A computer-readable medium having computer-executable instructions for organizing and displaying taskbar buttons associated with corresponding applications on a display having a taskbar, comprising:
- receiving a command to create a taskbar button for an application file;
- identifying an application associated with the application file;
- identifying any existing taskbar button representing a file created from the identified application; and
- automatically creating the new taskbar button and placing it adjacent to the identified existing taskbar button created from the identified application, such that taskbar buttons for like application files are displayed adjacent one another on the taskbar to form a cluster.

12. A method in a computer system of organizing and displaying running tasks associated with corresponding applications on a display having a taskbar, the method comprising:
- automatically clustering a plurality of like application program buttons on the taskbar such that each taskbar button representing a file associated with a first application program is placed adjacent second taskbar button representing a file associated with the first application;
- upon meeting a group threshold size by adding like application program buttons to the created cluster on the taskbar, automatically grouping the plurality of like taskbar application buttons to form a group application button, such that the individual taskbar buttons in the cluster are no longer displayed; and
- upon meeting an ungroup threshold by closing like application program files, automatically ungrouping the group application button to display the plurality of like taskbar application buttons, such that the group application button is no longer displayed.

13. The method as recited in claim 12, wherein each of the plurality of like taskbar application buttons has a corresponding application file.

14. The method as recited in claim 12, wherein the like taskbar application buttons are executed using the same application.

15. The method as recited in claim 12, wherein the group threshold size is approximately the width of an application icon plus three characters of text.

16. The method as recited in claim 12, wherein the group threshold size establishes a maximum number of buttons that can fit on the taskbar, and, wherein the ungroup threshold is met when there are the maximum number of buttons minus an ungrouping number on the taskbar and when the taskbar can accommodate a number of buttons equal to or less than the maximum number of taskbar buttons.

17. The method as recited in claim 16, wherein the ungrouping number is two.

18. The method of claim 12, further comprising:
- displaying the group button for a first type of application program files simultaneously with individual taskbar buttons for application files associated with a second type of application program.

19. A computer-readable medium having computer executable instructions for organizing and displaying running tasks associated with corresponding applications on a display having a taskbar, the method comprising:
- automatically clustering a plurality of like application program buttons on the taskbar such that each taskbar button representing a file associated with a first application program is adjacent another taskbar button representing a file associated with the first application;
- upon meeting a group threshold size by adding like application program buttons to the created cluster on the taskbar, automatically grouping the plurality of like taskbar application buttons to form a group application button, such that the individual taskbar buttons in the cluster are no longer displayed; and
- upon meeting an ungroup threshold by closing like application program files, automatically ungrouping the group application button to display the plurality of like taskbar application buttons, such that the group application button is no longer displayed.

20. In a computer system having a graphical user interface including a display and a user interface selection device, a method of providing and selecting clustered and grouped taskbar buttons, said method comprising:
- retrieving an application program file, wherein the application program file has a corresponding taskbar application button;
- displaying the taskbar application button;
- repeating the retrieving step and the displaying step for new applications opened;
- automatically clustering like application taskbar application buttons;
- upon meeting a predetermined cluster size, automatically retrieving a group application button;
- displaying the group application button and removing from the taskbar each of the like taskbar application buttons, such that a group button appears on the screen for each cluster of application buttons exceeding the predetermined cluster size, while taskbar application buttons for individual files not exceeding the predetermined cluster size appear on the screen simultaneously with the group button; and
- upon meeting an ungroup threshold, automatically displaying each of the like taskbar application buttons on the taskbar and removing the group application button.

21. The method as recited in claim 20 further comprising receiving a group entry selection signal indicative of a user selection of the group application button, and, in response to the group entry selection signal, displaying each of the like application program files on the display.

22. The method as recited in claim 21, wherein displaying each of the like application program files on the display includes displaying the files in a menu.

23. The method as recited in claim 20, wherein the predetermined size is approximately the width of an application icon plus three characters of text.

24. The method as recited in claim 20, wherein the predetermined size establishes a maximum number of buttons that can fit on the taskbar, and, wherein the ungroup threshold is met when there are the maximum number of buttons minus an ungrouping number on the taskbar and when the taskbar can accommodate a number of buttons equal to or less than the maximum number of taskbar buttons.

25. The method as recited in claim 24, wherein the ungrouping number is two.

26. In a computer system having a graphical user interface including a display and a user interface selection device, a method of presenting and accessing representations of one or more running tasks, said method comprising:

displaying a cluster, wherein the cluster includes a plurality of like taskbar application buttons;

upon meeting a first predetermined threshold, automatically displaying a group application button on the taskbar and removing the plurality of like taskbar application buttons on the taskbar, wherein the group application button includes the plurality of like taskbar application buttons, such that a group button appears on the screen for each cluster of application buttons exceeding the predetermined cluster size, while taskbar application buttons for individual files not exceeding the predetermined cluster size appear on the screen simultaneously with the group button; and upon meeting a second predetermined threshold, automatically displaying the plurality of taskbar application buttons on the taskbar and removing the group application button on the taskbar.

27. The method as recited in claim 26, wherein the first predetermined threshold is approximately the width of an application icon plus three characters of text.

28. The method as recited in claim 26, wherein the first predetermined threshold establishes a maximum number of buttons that can fit on the taskbar, and, wherein the second predetermined threshold is met when there are the maximum number of buttons minus an ungrouping number on the taskbar and when the taskbar can accommodate a number of buttons equal to or less than the maximum number of taskbar buttons.

29. The method as recited in claim 28, wherein the ungrouping number is two.

30. A computer-readable medium having computer-executable instructions for performing a method of presenting and accessing representations of one or more running tasks, comprising:

displaying a cluster, wherein the cluster includes a plurality of like taskbar application buttons;

upon meeting a first predetermined threshold, automatically displaying a group application button on the taskbar and removing the plurality of like taskbar application buttons on the taskbar, wherein the group application button includes the plurality of like taskbar application buttons, such that a group button appears on the screen for each cluster of application buttons exceeding the predetermined cluster size, while taskbar application buttons for individual files not exceeding the predetermined cluster size appear on the screen simultaneously with the group button; and upon meeting a second predetermined threshold, automatically displaying the plurality of taskbar application buttons on the taskbar and removing the group application button on the taskbar.

* * * * *